Aug. 14, 1951     L. NAVIAS     2,564,497
COMBUSTION CHAMBER LINER
Filed Nov. 26, 1947
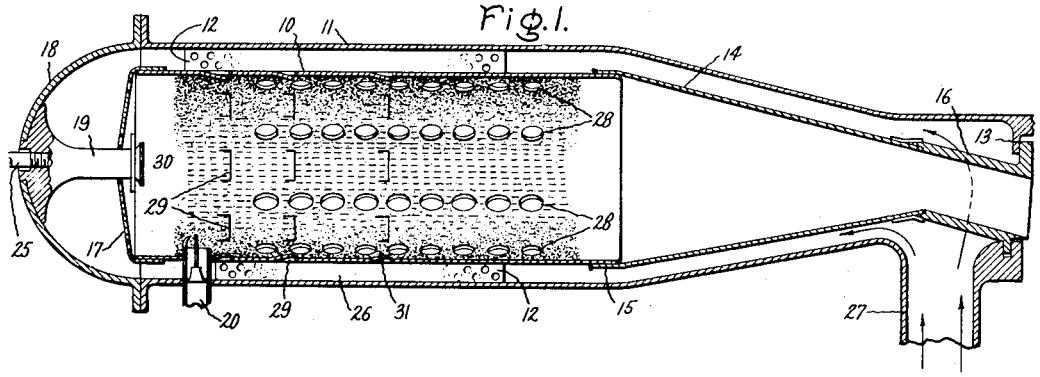
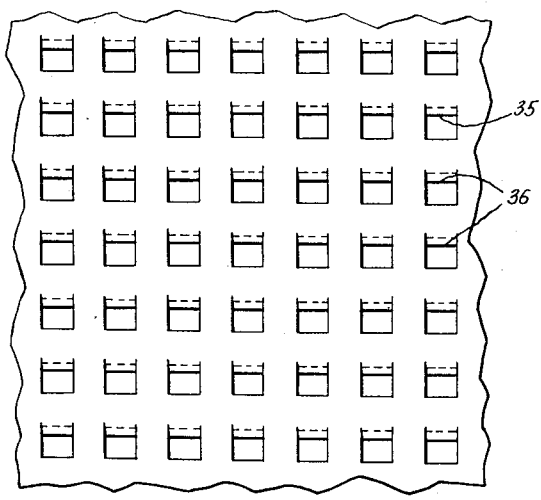
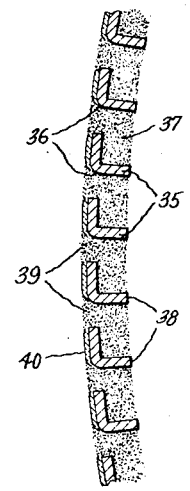
Inventor:
Louis Navias,
by Abraham Cohen
His Attorney.

Patented Aug. 14, 1951

2,564,497

UNITED STATES PATENT OFFICE 2,564,497

COMBUSTION CHAMBER LINER

Louis Navias, Schenectady, N. Y., assignor to General Electric Company, a corporation of New York Application November 26, 1947, Serial No. 788,298

5 Claims. (Cl. 110—1)

This invention relates to combustion chambers for effecting heat releasing reactions between two fluid reactants. It is particularly concerned with improved combustion chamber liners or flame tubes for devices employed for the combustion of fluid fuels in air, for instance as a combustor in a gas turbine powerplant, such as small, high capacity, light weight combustors for aircraft powerplants.

An object of the invention is to provide a fluid reaction device comprising a light weight, heat-resistant combustion chamber liner.

Another object is to provide an improved chamber liner for use in combustors for fluid fuels capable of withstanding the elevated temperatures resulting from the combustion of such fuels, which liner is simple and relatively inexpensive to fabricate, strong and light in weight, and capable of giving excellent performance with a greater life expectancy.

Another object is to provide a thin metal liner for a reaction device of the type described having a corrosion and heat-resistant coating over the surfaces exposed to the reaction products to prolong the liner life, and including means for anchoring the heat resistant coating to the liner.

The invention is applicable to apparatus for the combustion of a wide variety of liquid fuels, and may also be used with pulverized solid fuels entrained in a suitable fluid or with various other types of fluid reactants, such as those used with rocket or reaction motors. It will be particularly described in connection with the one modification of combustor described in the copending application Serial No. 750,015, filed May 23, 1947, in the name of Anthony J. Nerad and assigned to the same assignee as the present invention.

In the accompanying drawing, Fig. 1 is a longitudinal view of a combustor embodying my invention; Fig. 2 is an enlarged view of a portion of the liner illustrating the means for providing anchorage for the heat-resistant coating of the present invention, and Fig. 3 is a sectional view of a portion of the liner with the heat-resistant coating anchored thereon.

Referring to Fig. 1, the illustrated combustion unit comprises two coaxial walls, an inner wall or liner 10 and an outer wall 11 held in spaced relation to each other by a number of circumferentially spaced axially extending fins 12 which may be welded or otherwise fixed to either one or both of walls 10 and 11. The right-hand portions of the unit walls 10 and 11 are tapered and come together as indicated at 13. The tapered discharge portion of inner wall or liner 10 is preferably formed as a separate member 14 which telescopes over the main portion of the wall 10 as is indicated at 15 and its end is in the form of a discharge nozzle 16 which telescopes over and is loosely attached to member 14. This arrangement permits the parts to expand and contract readily relatively to each other. Discharge nozzle 16 may supply gases to any desired point of consumption such as to the buckets of a gas turbine wheel.

The forward or admission end of inner wall 10 is closed by a head 17. The forward or admission end of outer wall 11 is closed by a head or dome 18. Supported centrally in heads 17 and 18 is a fuel spray nozzle 19. At 20 is a suitable spark plug for igniting the fuel-air mixture. At 25 is a supply pipe through which fluid fuel is supplied to the nozzle at a suitable pressure by a pump or other means (not shown).

The space between walls 10 and 11 and between heads 17 and 18 forms a plenum chamber 26 to which air is supplied by a conduit 27 from any suitable source, such as an air compressor (not shown). In the case of a gas turbine powerplant, it may be an air compressor driven by a turbine operated by hot gases from the combustion unit.

In inner wall or liner 10 are a plurality of circumferentially spaced axially extending rows of holes 28 through which combustion air passes from plenum chamber 26 to the axially elongated reaction space defined by inner wall 10. In the present instance, eight longitudinal rows of holes are shown equally spaced circumferentially. However, a somewhat greater or lesser number may be utilized.

The longitudinal rows of holes 28 terminate short of head 17 (or, otherwise stated, the first circumferential row of holes is spaced from head 17) to define what may be termed an initial mixing and ignition chamber 30 to which no air is directly discharged through the combustion air inlet holes 28.

It will be seen that in the illustrated modification the axial rows of holes 28 are arranged so that corresponding holes in the respective rows are in a common plane normal to the axis of the chamber. The fuel nozzle discharges fuel in a spray into chamber 30, the arangement being such that the fuel is distributed in the form of a substantially hollow cone. The first ring of holes 28 is spaced from head 17 a distance such that fuel discharged from the spray nozzle does not reach them, so that drops of liquid fuel are not discharged directly into the comparatively cool entering air jets from the holes 28.

In operation, fuel is supplied to chamber 30 by nozzle 19 and air is supplied through holes 28 to the combustion chamber. Air entering through each circumferential ring of holes flows in substantially radial jets toward each other, meeting at the center of the combustion chamber. From the center of the combustion chamber, the air turns and flows axially. From the first two or three rings of holes next adjacent the mixing chamber 30 air flows axially toward end closure head 17, the flow toward the head being confined to the central portion of the chamber. As the air approaches the head, it spirals radially outward transversely across the oil spray picking up fuel particles. This fuel-air mixture becomes commingled with the air from the remaining rings of holes, the final result being a complete and thorough mixing of the fuel with the air and burning of the fuel.

In the design of liners of the type described herein one object was to provide a thin-walled, light-weight liner so constructed that the walls thereof could be cooled to such an extent that ordinary stainless steel alloy such as one composed of 25 per cent chromium, 20 per cent nickel, balance iron, could be used in its construction. For this purpose, a plurality of slots 29 and associated deflecting plates 31 were provided in the walls of the liner so that air entering the slots will sweep over the inner wall of the liner and serve to some extent to protect the liner wall from the combustion temperatures. In spite of such measures taken to cool the liner walls, it has been found that the useful life of the metal liners 10 is short. Because weight must generally be kept to a minimum, as for example in air craft power plants, the liner is preferably made of thin metal sheet material of a thickness for example of 0.04 inch. When kerosene is used as a fuel the products of combustion attack the metal liner causing erosion and scaling. Due to high heat stresses, the liners tend to warp badly. The conditions are much worse when gasoline is used because of the tetra-ethyl lead used in some gasoline. While the lead content of such gasoline per gallon is small, the accumulation in time is quite appreciable. Metallic lead will attack hot metal surfaces, and its lead oxide when hot is even a flux for practically all ceramic and inorganic substances. For these reasons the combustion liners are usually the shortest lived part of turbo-jet engines and considerable research has been directed towards providing liners which in addition to being strong and light weight will also stand up under service conditions.

The present invention is based on the discovery that the life of the metal liners can be substantially increased by providing all or part of the surfaces thereof with a heat-resistant and corrosion-resistant glass and refractory coating applied to and anchored on the liner by means of projections integral with the liner walls. The coating found useful for the purpose is a combination of a high melting glass of the composition

| | Per cent |
|---|---|
| $SiO_2$ | 53–64 |
| $Fe_2O_3$ | 17–21 |
| $Al_2O_3$ | 1–14 |
| $Na_2O$ | 13–16 |
| $K_2O$ | 0–2 | and a granular refractory material, e. g., fused magnesia. Means for anchoring the coating on the desired portions of the metal liner are shown in Figs. 2 and 3 as comprising a plurality of tabs 35 extending inwardly from the liner walls and obtained by punching perforations in the sheet metal walls employing a punch which leaves one side of each punching attached to the main body of sheet metal and bent along the attached side as shown at 36 so that the tabs or tongues 35 project from the walls 10 a distance preferably of from one to three-sixteenths of an inch. The perforations are closely spaced for example about one-eighth inch apart both laterally and circumferentially of the walls 10 and are provided over the entire surface area of the liner on which maximum protection is desired. By this means, anchorage for the coating material which is subsequently applied is provided without increasing the weight of, that is the amount of metal in, the liner. In Fig. 1 the perforations are shown as being provided over most of the surface area of the liner wall 10 although it is to be understood that additional areas may also be so treated. For example, the tapered wall section 14 can be perforated and coated in the same manner. In all cases the tube or prongs 35 project from the surface of the liner walls in the direction requiring greatest protection of the sheet metal.

The protective coating is applied to the liner in two steps. After cleaning the metal walls, as by means of sand blasting, a slip comprising a suspension of the powdered high melting point glass of the composition described hereinbefore is sprayed or otherwise applied over the entire surface of the liner and fired into place. Thereafter the surface of the liner requiring the maximum protection is coated with a mixture of granular fused magnesia and the same powdered high melting point glass with sufficient moisture to give the mixture a mortar-like consistency. This mortar mixture is applied in such a manner as to fill up all of the spaces or interstices between the tabs 35 and also to fill the holes made by the punch during the punching out of the tabs. This refractory coating is then fired at a temperature sufficient to fuse the glass. The resultant coated liner is shown in cross section in Fig. 3 as comprising a fused mixture of magnesia and glass 37, the inner surface of which is flush, or substantially flush, with the ends 38 of tabs 35 and which extends through the perforations 39 between the tabs 35.

During firing of the refractory coating the original glass coating becomes integral with the magnesia-containing mixture wherever the latter has been applied to the liner while the surfaces not so coated, such as surfaces 40 on the outside of the liner are protected by the glassy layer.

A preferred high melting point glass for use in the practice of the present invention is one comprising a fused mixture of about 64 per cent silica, 21 per cent $Fe_2O_3$, 1 per cent $Al_2O_3$, and 14 per cent $Na_2O$. This glass can be fired at about 1000° C. to form a smooth coating. To apply the glass to the liner surfaces, the glass is first powdered and a slip made from the powdered glass for example by forming an aqueous suspension thereof employing a colloidal suspension agent such as suitable clay. One suitable slip comprises 120 parts powdered glass, 1 part borax, 10 parts clay, .05 part barium nitrate and 100 parts water. This suspension can be sprayed on the liner and fired in place by heating the coated liner to a temperature of about 1000° C.

Another glass which has been found to be particularly useful is one containing 53 per cent $SiO_2$, 17 per cent $Fe_2O_3$, 14 per cent $Al_2O_3$, 14 per cent Na$_2$O and 2 per cent K$_2$O. This glass is more viscous than the one described hereinbefore and requires a firing temperature of at least 1000° C. and preferably from 1000 to 1100° C.

The magnesia-glass mixtures employed in the practice of the present invention have approximately the same expansion characteristics as the metal and preferably comprise 60 to 90 per cent by weight magnesia, the remainder being powdered glass or mixtures of powdered glass and small amounts of clay. Sufficient water is added to these mixtures to form a mortar of a consistency such that it can be applied to the surfaces of the liner provided with the projections or tabs 35 and will remain in place during handling prior to the firing operation. A suitable refractory mixture comprises about 78 per cent of 40-60 mesh fused magnesia oxide, about 2 per cent suspending clay and about 20 per cent powdered glass. The magnesia-containing coating is fired at a temperature corresponding to that employed for fusing the glass constituent thereof.

It is essential that the glass component contain a relatively high content of oxide of a metal of the iron group as "saturating" of the glass layer with such an oxide tends to prevent the metal of the liner going into solution in the glass at elevated temperatures. While iron oxide is preferred a few per cent thereof can be replaced by an oxide of chromium.

Liners coated as described herein have been found to have a useful life of at least twice that of uncoated liners of the same sheet metal. For example, an uncoated Inconel liner had a useful life of only 75 hours when tested on a cyclic endurance test whereas a coated Inconel liner did not fail after 173 hours on the same test cycle.

Any of the usual metal alloys can be used in forming the liner walls. Inconel (12-14% Cr, 78-80% Ni, 6-8% Fe), 2520 alloy (25% Cr, 20% Ni, balance Fe) or aluminum-coated or calorized low carbon sheet steel, have all been used successfully. In the case of the low carbon sheet steel, the aluminum coating prevents oxidation of the base metal which would otherwise take place at the elevated temperatures required for fusing the glassy coating.

What I claim as new and desire to secure by Letters Patent of the United States, is:

1. A fluid fuel combustion chamber liner comprising a thin sheet metal wall portion of a ferrous alloy, a plurality of closely-spaced tabs punched from the metal of said wall portion and extending upwardly from one face of said wall portion, and a refractory coating on said wall portion, said coating including a glass component rich in an oxide of a metal of the iron group and being of a thickness substantially equal to the length of said tabs and being anchored to said wall portion by means including said tabs.

2. A liner for use in a fluid fuel combustion chamber comprising a substantially cylindrical sheet metal wall of a ferrous alloy, a plurality of tabs punched from the metal of said wall and extending inwardly therefrom, a coating of a high melting point glass on the exterior surface of said wall and a layer of refractory coating material on the inner surface thereof, said layer of refractory coating material being anchored to said wall by said tabs, the surface of said coating being substantially flush with the inner ends of said tabs, said glass and the glassy component of the refractory coating material being substantially saturated with an oxide of a metal of the iron group.

3. A liner for use in a fluid fuel combustion chamber comprising a substantially cylindrical thin sheet metal wall of a ferrous alloy, a plurality of tabs punched from the metal of said wall and extending inwardly therefrom, a coating of a high melting point glass saturated with iron oxide on the exterior surface of said wall and a layer of refractory coating material on the inner surface thereof, said layer of refractory coating material comprising from 60 to 90 percent magnesia and said high melting-point glass and being anchored to said wall by said tabs, the surface of said coating being substantially flush with the inner ends of said tabs.

4. A liner for use in a fluid fuel combustion chamber comprising a substantially cylindrical thin sheet metal wall portion of a ferrous alloy, a refractory coating on at least one surface of said wall portion and means for anchoring said coating on said wall, said anchoring means comprising a plurality of tabs punched from the metal of said wall portion with one end of each of said tabs attached to the sheet metal and the opposite extending upwardly from the face of the sheet metal, said coating comprising a high melting point glass rich in an oxide of iron.

5. A liner for use in a fluid fuel combustor, said liner comprising a cylindrical wall portion formed of ferrous alloy sheet metal, a plurality of tongues punched from the sheet metal with the ends thereof extending inwardly, a refractory coating on the inner surface of said wall portion, said coating being of a thickness substantially equal to the length of said tongues and extending into the openings formed in the sheet metal by the punching of said tongues, said coating comprising a high melting point glass containing a substantial quantity of an iron oxide.

LOUIS NAVIAS.

REFERENCES CITED

The following references are of record in the file of this patent:

UNITED STATES PATENTS

| Number | Name | Date |
|---|---|---|
| 1,818,904 | Martin | Aug. 11, 1931 |
| 1,924,311 | Frey | Aug. 29, 1933 |
| 2,270,297 | Hensel | Jan. 20, 1942 |
| 2,282,293 | Christenson | May 5, 1942 |